(12) United States Patent
Yabe

(10) Patent No.: US 8,661,462 B2
(45) Date of Patent: Feb. 25, 2014

(54) INFORMATION PROCESSING APPARATUS AND METHOD, COMPUTER PROGRAM THEREOF, AND RECORDING MEDIUM

(75) Inventor: Jun Yabe, Tokyo (JP)

(73) Assignee: Sony Corporation, Tokyo (JP)

( * ) Notice: Subject to any disclaimer, the term of this patent is extended or adjusted under 35 U.S.C. 154(b) by 1314 days.

(21) Appl. No.: 11/101,356

(22) Filed: Apr. 6, 2005

(65) Prior Publication Data

US 2005/0229199 A1    Oct. 13, 2005

(30) Foreign Application Priority Data

Apr. 7, 2004    (JP) ................................. 2004-113284

(51) Int. Cl.
*H04H 60/33*    (2008.01)
*G06F 3/00*    (2006.01)
*G06F 13/00*    (2006.01)

(52) U.S. Cl.
USPC ...................... 725/9; 725/10; 725/11; 725/46

(58) Field of Classification Search
USPC ........................................................... 725/10
See application file for complete search history.

(56) References Cited

U.S. PATENT DOCUMENTS

| | | | |
|---|---|---|---|
| 6,177,931 B1 * | 1/2001 | Alexander et al. ............... | 725/52 |
| 2004/0049787 A1 * | 3/2004 | Maissel et al. .................. | 725/46 |
| 2005/0183110 A1 * | 8/2005 | Anderson ........................ | 725/12 |
| 2006/0015902 A1 * | 1/2006 | Matsuura et al. ............... | 725/46 |
| 2011/0088060 A1 * | 4/2011 | Knee et al. ...................... | 725/34 |

FOREIGN PATENT DOCUMENTS

JP    2003-111106    4/2003

* cited by examiner

*Primary Examiner* — Nasser Goodarzi
*Assistant Examiner* — Fred Peng
(74) *Attorney, Agent, or Firm* — Finnegan, Henderson, Farabow, Garrett & Dunner, L.L.P.

(57) ABSTRACT

An information processing apparatus is provided in which a first record control means controls record of user presence time information indicating time in which a user was present within a predetermined range around a display means displaying content, based on an output from a sensor detecting the user; a second record control means controls record of operation history information including content specifying information for specifying the content as target of operation, operation content information for indicating content of operation related to display of the content by the user, and operation time information for indicating time of the operation; and an audience-quality constituent item calculation means calculates an audience-quality constituent item constituting audience quality which indicates quality of content watched by the user, based on the recorded user presence time information and operation history information.

16 Claims, 15 Drawing Sheets

| HUMAN DETECTION START TIME | HUMAN DETECTION FINISH TIME |
|---|---|
| 2004 1/30 10:10 | 2004 1/30 11:55 |
| 2004 1/30 17:25 | 2004 1/30 18:30 |
| 2004 1/30 21:10 | 2004 1/30 22:35 |

FIG. 8

| RECORD No | DATA AND TIME | TYPE OF OPERATION | WATCHED PROGRAM ID |
|---|---|---|---|
| 1 | 2004 1/25 9:30 | Show EPG | 0012-20040129-000017 |
| ... | ... | ... | ... |
| 3 | 2004 1/30 10:10 | TV Power on | 0003-20040130-000011 |
| 4 | 2004 1/30 10:15 | NULL | 0003-20040130-000012 |
| 5 | 2004 1/30 10:30 | TV Channel 10 | 0010-20040130-000015 |
| 6 | 2004 1/30 10:55 | NULL | 0010-20040130-000016 |
| 7 | 2004 1/30 11:25 | NULL | 0010-20040130-000017 |
| 8 | 2004 1/30 11:55 | TV Power off | NULL |
| 9 | 2004 1/30 17:30 | TV Power on | 0010-20040130-000032 |
| 10 | 2004 1/30 17:30 | HDR-play | 0012-20040129-000017 |
| 11 | 2004 1/30 18:30 | TV Power off | NULL |
| 12 | 2004 1/30 21:10 | TV Power on | 0010-20040130-000052 |
| 13 | 2004 1/30 21:10 | TV Channel 8 | 0008-20040130-000050 |
| 14 | 2004 1/30 22:33 | TV Power off | NULL |

FIG. 10

| PROGRAM ID | START TIME | END TIME | CHANNEL | TITLE |
|---|---|---|---|---|
| 0012-20040129-000017 | 2004 1/29 3:00 | 2004 1/29 4:00 | 12 | ○○○ |
| ... | ... | ... | ... | ... |
| 0003-20040130-000011 | 2004 1/30 10:00 | 2004 1/29 10:15 | 3 | ×××  |
| 0003-20040130-000012 | 2004 1/30 10:15 | 2004 1/29 10:30 | 3 | △△△ |
| ... | ... | ... | ... | ... |
| 0010-20040130-000015 | 2004 1/30 10:00 | 2004 1/30 10:00 | 10 | AAA |
| 0010-20040130-000016 | 2004 1/30 10:00 | 2004 1/30 10:00 | 10 | BBB |
| 0010-20040130-000017 | 2004 1/30 10:00 | 2004 1/30 10:00 | 10 | CCC |
| ... | ... | ... | ... | ... |

FIG. 15

| PROGRAM ID | AUDIENCE-QUALITY CONSTITUENT ITEM (0) VALUE | AUDIENCE-QUALITY CONSTITUENT ITEM (1) VALUE | AUDIENCE-QUALITY CONSTITUENT ITEM (2) VALUE | ... |
|---|---|---|---|---|
| 003-20040130-000011 | 0 | 1 | 1 | ... |
| 003-20040130-000012 | 0.5 | 1 | 1 | ... |
| ... | ... | ... | ... | ... |

INFORMATION PROCESSING APPARATUS AND METHOD, COMPUTER PROGRAM THEREOF, AND RECORDING MEDIUM

CROSS REFERENCE TO RELATED APPLICATIONS

The present document is based on Japanese Priority Document JP2004-113284, filed to the Japanese Patent Office on Apr. 7, 2004, the contents of which being incorporated herein by reference.

BACKGROUND OF THE INVENTION

1. Field of the Invention

The present invention relates to information processing apparatus and method, a computer program thereof, and a recording medium, in particular to information processing apparatus and method, a computer program thereof, and a recording medium, which do not place a burden to a user, but acquire a degree of expectation, a degree of concentration, and a degree of satisfaction with respect to a program, so as to measure an audience quality with higher efficiency.

2. Description of Related Art

In recent years, in addition to a conventional audience rate, the audience quality showing how a TV program is watched by viewers is introduced as a measure of evaluation of a TV program. Examples of audience quality investigation may be Research Q (see http://www.rq-tv.com/) carried out jointly by TV Asahi and Keio University, a viewer's satisfaction degree survey FASS (Fuji Television Audience Satisfaction Survey) conducted by Fuji Television Network, Inc. etc. However, both integration methods measure audience qualities based on a questionnaire conducted to a viewer after watching, and so need considerable time and labor. Then, a method of finding audience quality of a watched program is proposed by using an algorithm which finds the audience quality by approximation (for example, see Japanese Laid-open Patent Application No. 2003-111106).

In prior art techniques, a user's operation history is analyzed by a program selection support apparatus. When a particular program is watched for a certain period of time, a dialog into which the user inputs an evaluation of the program is displayed. Based on the user's evaluation inputted into the dialog, user's interest (audience quality) in the program is measured.

According to an invention disclosed in Japanese Laid-open Patent Application No. 2003-111106, based on vital reactions (skin dielectric constant, skin temperature, pulse) acquired through a sensor worn by a viewer, a degree of concentration (audience quality) with respect to a program being watched by the viewer is measured.

However, according to prior art techniques, the viewer has to input the evaluation into the dialog. As a result, there is an inconvenience in that a burden is placed on the viewer.

Furthermore, according to prior art techniques, although it is possible to acquire a degree of satisfaction, which is an evaluation value after watching the program, among items which constitute the audience quality, there is a problem that a degree of expectation which is an evaluation value before watching the program, or a degree of concentration which is an evaluation value during watching the program, cannot be measured.

Further, according to the technology disclosed in Japanese Laid-open Patent Application No. 2003-111106, the viewer has to wear the sensor every time and this may constitute a cumbersome operation for the user. Furthermore, according to the technology disclosed in Japanese Laid-open Patent Application No. 2003-111106, although it is possible to acquire the degree of concentration, which is the evaluation value during watching the program, among the items which constitute the audience quality, there may be a problem in that the degree of expectation which is the evaluation value before watching the program, or the degree of satisfaction which is the evaluation value after watching the program, cannot be measured.

SUMMARY OF THE INVENTION

In view of the above situation, the present invention has been conceived so as not to place a burden on a user, but to acquire a degree of expectation and a degree of concentration, and a degree of satisfaction with respect to a program, and more efficiently measure an audience quality.

An information processing apparatus in accordance with a preferred embodiment of the present invention includes: a first record control means for controlling record of user presence time information indicating time in which a user was present within a predetermined range around a display means displaying content, based on an output from a sensor detecting the user; a second record control means for controlling record of operation history information including content specifying information for specifying the content as target of operation, operation content information for indicating content of operation related to display of the content by the user, and operation time information for indicating time of the operation; and audience-quality constituent item calculation means for calculating an audience-quality constituent item constituting audience quality which indicates quality of content watched by the user, based on the recorded user presence time information and operation history information.

It is preferable to have the information processing apparatus further including a third record control means for acquiring the content specifying information for specifying broadcast content, and EPG information containing broadcast start time and broadcast end time of the content, and controlling record of the EPG information; wherein: the audience-quality constituent item calculation means calculates the audience-quality constituent item of the broadcast content, based on the user presence time information, the operation history information and the EPG information.

An information processing apparatus according a preferred embodiment of the present invention further may further include an audience quality generation means for generating data of the audience quality, based on a value of the audience-quality constituent item calculated by the audience-quality constituent item calculation means.

In an information processing apparatus according a preferred embodiment of the present invention, the audience-quality constituent item calculation means may include at least a degree-of-expectation calculation means for calculating a degree of expectation indicating a degree of the user's expectation regarding the content; a degree-of-concentration calculation means for calculating a degree of concentration indicating a degree of concentration of the user when watching the content; and a degree-of-satisfaction calculation means for calculating a degree of satisfaction indicating a degree of satisfaction of the user having watched the content.

In an information processing apparatus according a preferred embodiment of the present invention, the audience quality generation means may store data of the calculated audience quality into an audience quality database, and the data of the audience quality stored in the audience quality database is transmitted to another apparatus via a network at a preset timing.

An information processing apparatus according a preferred embodiment of the present invention may further include deletion means for deleting unnecessary information among the user presence time information, operation history information, EPG information, and information of the audience quality database.

An information-processing method according a preferred embodiment of the present invention may include: a first recording step of recording user presence time information indicating time in which a user was present within a predetermined range around a display means displaying content, based on an output from a sensor detecting the user; a second recording step of recording operation history information including content specifying information for specifying the content as target of operation, operation content information for indicating content of operation related to display of the content by the user, and operation time information for indicating time of the operation; and audience-quality constituent item calculation step of calculating an audience-quality constituent item constituting audience quality which indicates quality of content watched by the user, based on the recorded user presence time information and operation history information.

A computer-readable program according a preferred embodiment of the present invention may include the steps for causing a computer to execute: a first record control step of controlling record of user presence time information indicating time in which a user was present within a predetermined range around a display means displaying content, based on an output from a sensor detecting the user; a second record control step of controlling record of operation history information including content specifying information for specifying the content as target of operation, operation content information for indicating content of operation related to display of the content by the user, and operation time information for indicating time of the operation; and audience-quality constituent item calculation step of calculating an audience-quality constituent item constituting audience quality which indicates quality of content watched by the user, based on the recorded user presence time information and operation history information.

A recording medium according a preferred embodiment of the present invention may record a computer-readable program for causing a computer to execute: a first record control step of controlling record of user presence time information indicating time in which a user was present within a predetermined range around a display means displaying content, based on an output from a sensor detecting the user; a second record control step of controlling record of operation history information including content specifying information for specifying the content as target of operation, operation content information for indicating content of operation related to display of the content by the user, and operation time information for indicating time of the operation; and audience-quality constituent item calculation step of calculating an audience-quality constituent item constituting audience quality which indicates quality of content watched by the user, based on the recorded user presence time information and operation history information.

In the information processing apparatus and method, and the computer program in accordance with a preferred embodiment of the present invention, based on the output from the sensor for detecting the user, user presence time information is recorded showing the time when the user is present within a predetermined range around the display means for displaying the content. An operation history information is recorded which includes the content specifying information for specifying the content to be operated, the operation content information showing the type of operation carried out by the user with respect to displaying of the content, and the operation time information showing the time when the operation is carried out. The audience-quality constituent item is calculated which constitutes the audience quality showing the quality of the content watched by the user, based on the user presence time information and operation history information which are recorded.

According to a preferred embodiment of the present invention, the audience quality can be measured. In particular, the burden is not placed on the user, but the degree of expectation, the degree of concentration, and the degree of satisfaction with respect to the program can be acquired, and the audience quality can be measured more efficiently.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 8 is a chart showing an example of a structure of a user operation history database;

FIG. 10 is a chart showing an example of a structure of an EPG information database;

FIG. 15 is a chart showing an example of a structure of an audience quality database;

DESCRIPTION OF THE PREFERRED EMBODIMENTS

Hereafter, preferred embodiments of the present invention will be described, and the followings are relationships between the invention described in the present specification and the preferred embodiments according to the present invention. The description is for confirming that the preferred embodiments which support the invention recited in the present specification is described in the present specification. Therefore, if there is a preferred embodiment which is described in the specification and not described herein, it does not mean that the preferred embodiment does not correspond to the invention. In contrast, if the preferred embodiment is described as one corresponding to the invention, it does not mean that the preferred embodiment does not correspond to any invention other than the invention.

Further, this description does not mean the entire invention as described in the present specification. In other words, this description does not deny existence of the invention which is described in the present specification but not claimed in this application, i.e., existence of the invention to be divided into a divisional application or to be added through amendments in the future.

Figure 2:
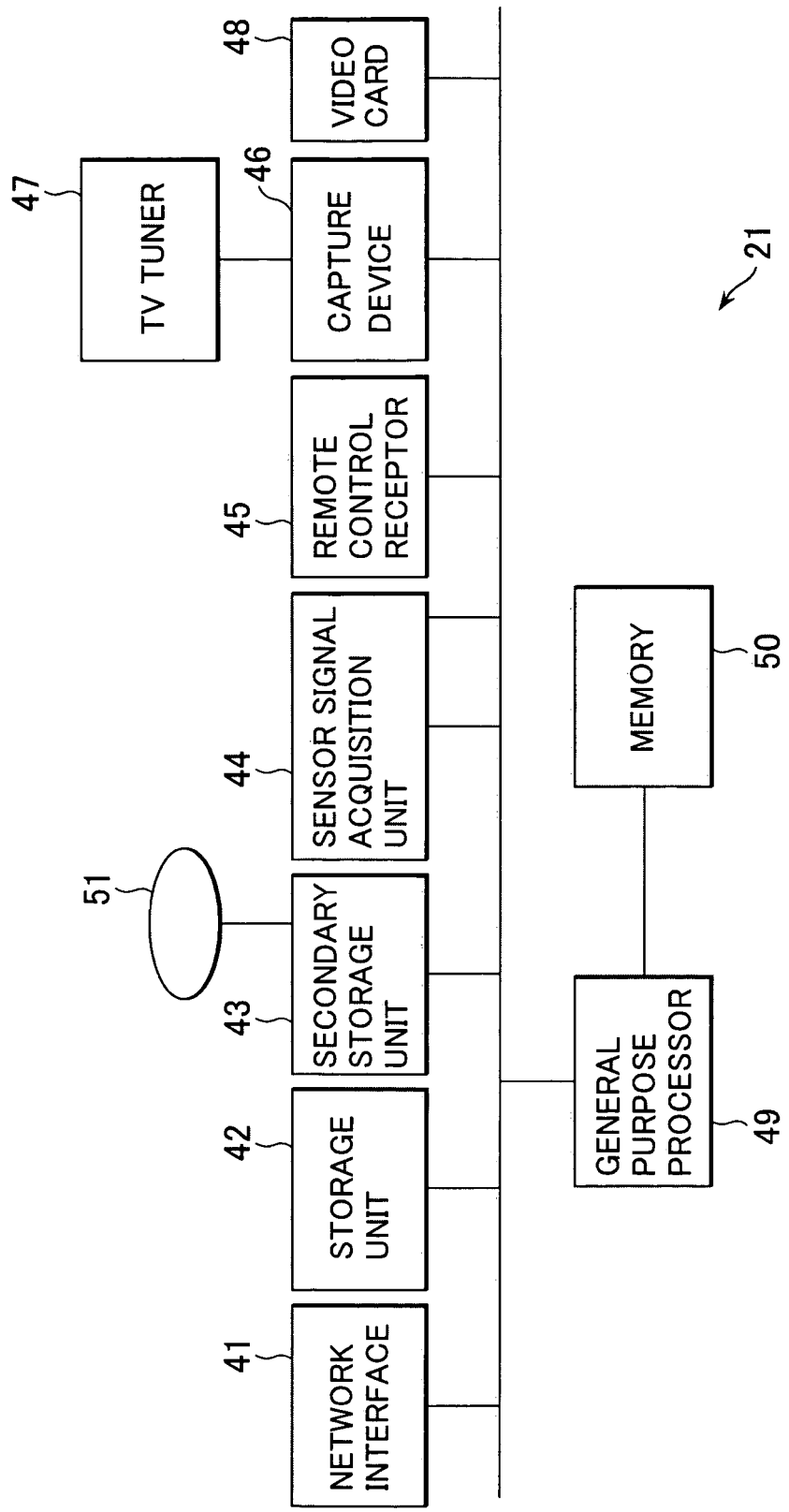
FIG. 2 is a block diagram showing an example of a structure of an audience quality calculation function.
Figure 3:
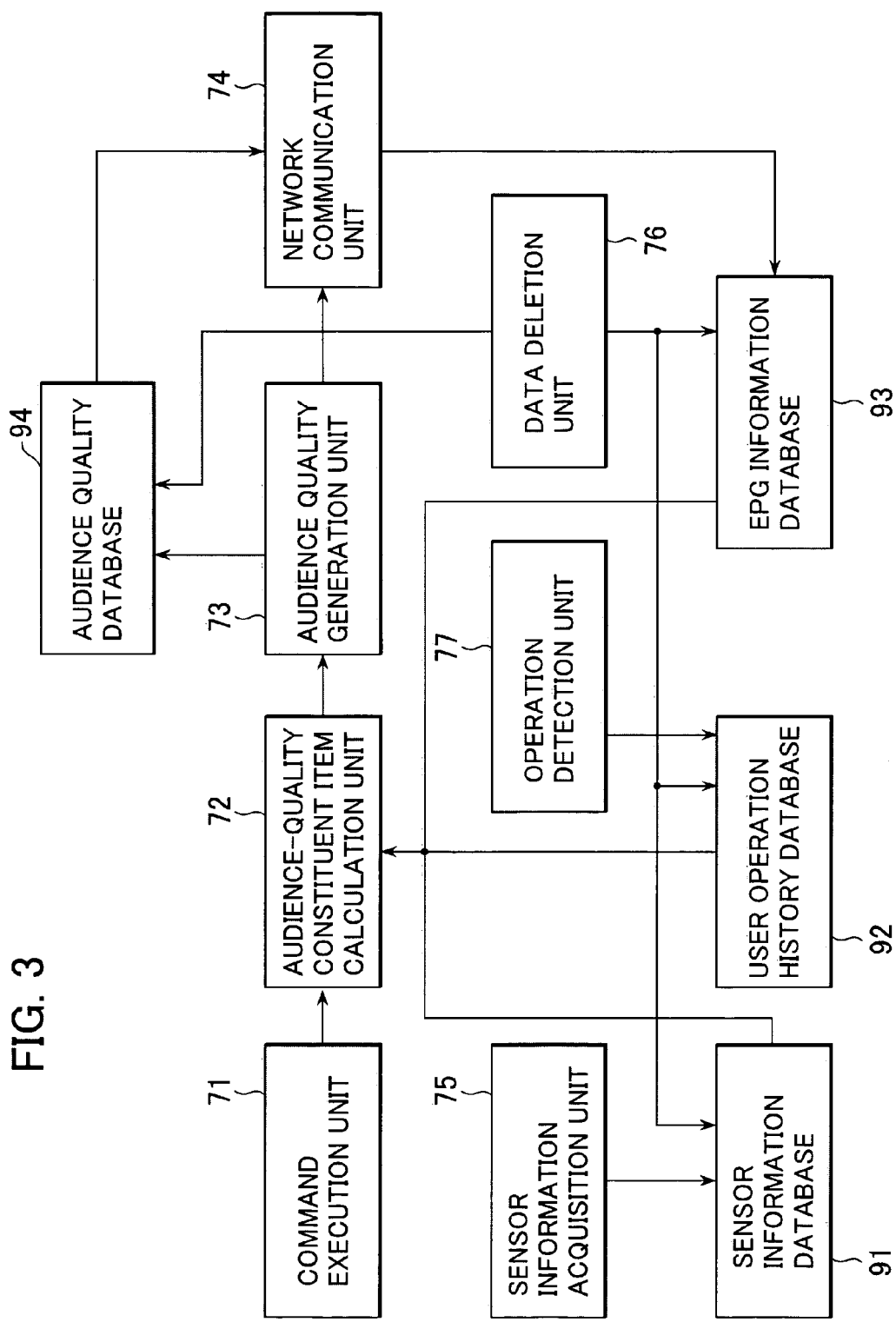
FIG. 3 is a block diagram showing an example of a structure of software installed in the audience quality calculation function of FIG. 2.

The information processing apparatus (for example, an audience quality calculation function 21 of FIG. 2) according to a preferred embodiment of the present invention includes: the first record control means (for example, a sensor information acquisition unit 75 of FIG. 3) for controlling the record of the user presence time information (for example, a sensor information database 91 of FIG. 3) showing the time when the user is present in the predetermined range around the display means (for example, a TV receiving set 2 of FIG. 1) for displaying the content, based on the output from the sensor (for example, a human detecting sensor 4 of FIG. 1) for detecting a user; the second record control means (for example, an operation detection unit 77 of FIG. 3) for controlling the record of the operation history information (for example, a user operation history database 92 of FIG. 3) including the content specifying information for specifying the content to be operated, the operation content information showing the type of operation carried out by the user with respect to the display of the content, and the operation time information showing the time when the operation is carried but; and the audience-quality constituent item calculation means (for example, an audience-quality constituent item calculation unit 72 of FIG. 3) for calculating the audience-quality constituent item which constitutes the audience quality showing the quality of the content watched by the user, based on the user presence time information and the operation history information which are recorded.

The information processing apparatus according to another preferred embodiment of the present invention is further provided with the third record control means (for example, network communication unit 74 of FIG. 3) for acquiring the content specifying information for specifying the broadcast content and EPG (Electric Program Guide) information containing the broadcast start time and broadcast end time of the content, and controlling the record of the EPG information (for example, EPG information database 93 of FIG. 3), and the audience-quality constituent item calculation means may be arranged to calculate the audience-quality constituent item of the content being broadcast, based on the user presence time information, the operation history information, and the EPG information.

The information processing apparatus according to another preferred embodiment of the present invention is further provided with the audience quality generation means (for example, an audience quality generation unit 73 of FIG. 3) for generating the data of the audience quality, based on the value of the audience-quality constituent item calculated by the audience-quality constituent item calculation means.

Figure 4:
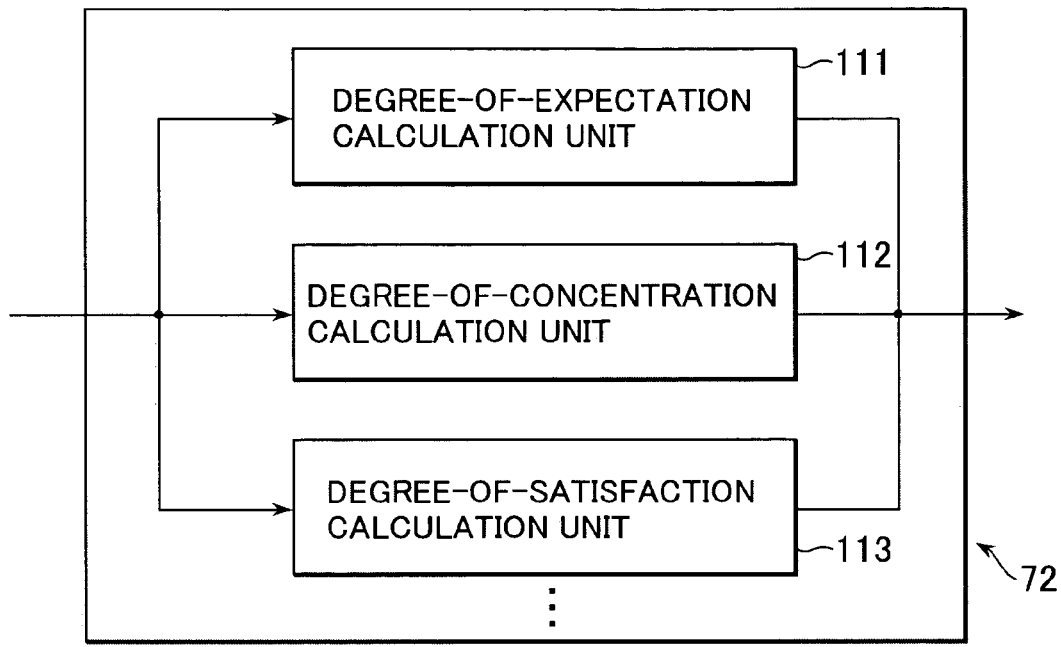
FIG. 4 is a block diagram showing a detailed example of a structure of an audience-quality constituent item calculation unit of FIG. 3.

In the information processing apparatus according to another preferred embodiment of the present invention, the audience-quality constituent item calculation means may be provided with, at least, the degree-of-expectation calculation means (for example, a degree-of-expectation calculation unit 111 of FIG. 4) for calculating the degree of expectation representing the degree of the user's expectation for the content; the degree-of-concentration calculation means (for example, a degree-of-concentration calculation unit 112 of FIG. 4) for calculating the degree of concentration representing the degree of concentration of the user watching the content; and the degree-of-satisfaction calculation means (for example, a degree-of-satisfaction calculation unit 113 of FIG. 4) for calculating the degree of satisfaction representing the degree of satisfaction of the user having watched the content.

Figure 11:
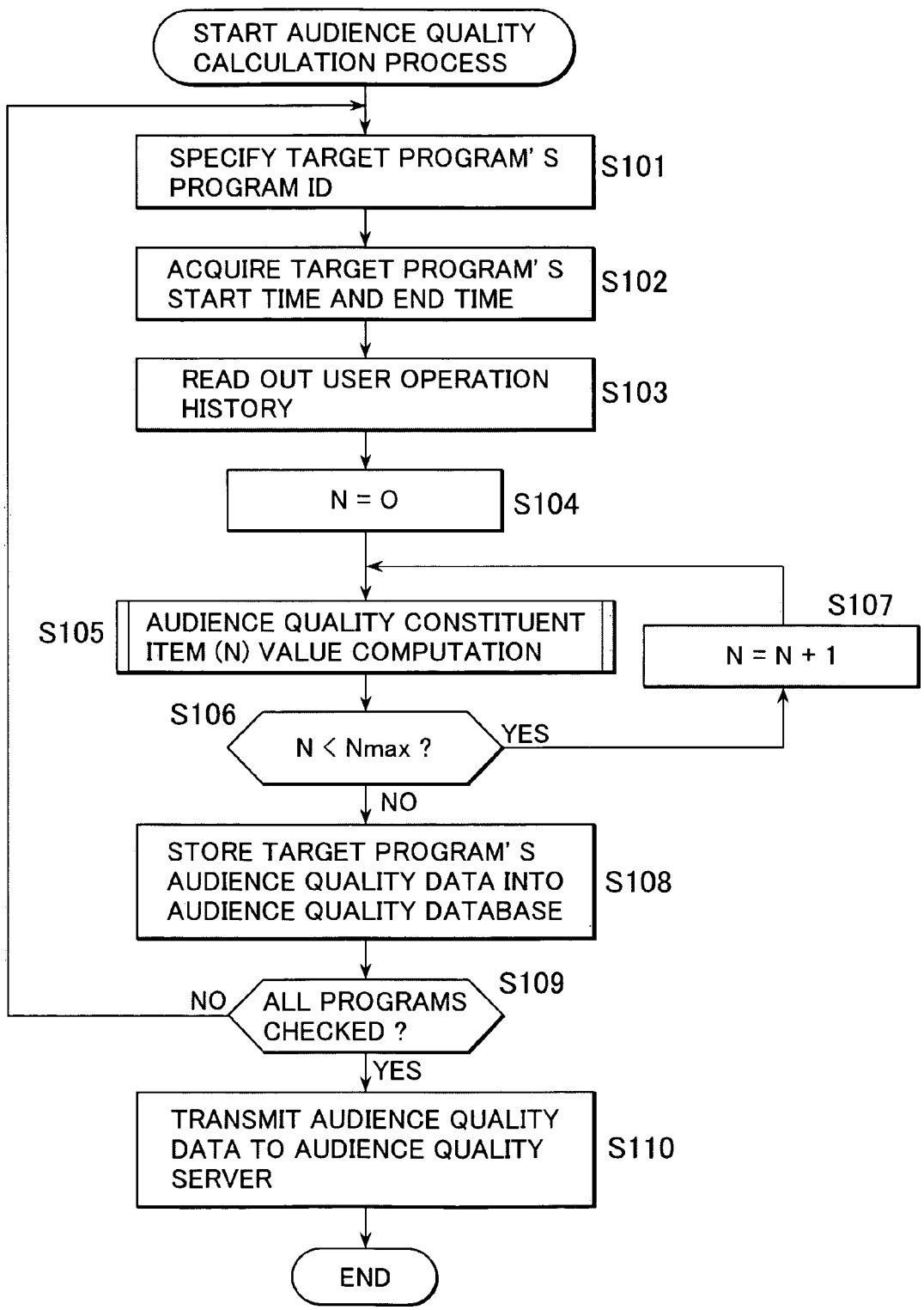
FIG. 11 is a flow chart for explaining an audience quality calculation process.

In the information processing apparatus according another preferred embodiment of the present invention, the audience quality generation means stores the data of the calculated audience quality into the audience quality database (for example, an audience quality database 94 of FIG. 3), and the data of the audience quality which is stored in the audience quality database is transmitted through the network to another apparatus (for example, an audience quality server 7) at the preset timing (transmitted by processing of step S110 of FIG. 11, for example).

The information processing apparatus according to another preferred embodiment of the present invention is further provided with the deletion means (for example, a data deletion unit 76 of FIG. 3) for deleting unnecessary information among the user presence time information, the operation history information, the EPG information, and the information in the audience quality database.

The information-processing method according to another preferred embodiment of the present invention includes: the first record step (for example, step S12 of FIG. 5) of recording the user presence time information (for example, the sensor information database 91 of FIG. 3) showing the time when the user is present in the predetermined range around the display means (for example, the TV receiving set 2 of FIG. 1) for displaying the content, based on the output from the sensor (for example, the human detecting sensor 4 of FIG. 1) for detecting the user; the second record step (for example, step S32 of FIG. 7) of recording the operation history information (for example, the user operation history database 92 of FIG. 3) including the content specifying information for specifying the content to be operated, the operation content information showing the type of operation carried out by the user with respect to the displaying of the content, and the operation time information showing the time when the operation is carried out; and the audience-quality constituent item calculation step (for example, step S105 of FIG. 11) of calculating the audience-quality constituent item which constitutes the audience quality showing the quality of the content watched by the user, based on the user presence time information and operation history information which are recorded.

The computer program according to another preferred embodiment of the present invention may cause a computer to execute: the first record control step (for example, step S12 of FIG. 5) of controlling the record of the user presence time information (for example, the sensor information database 91 of FIG. 3) showing the time when the user is present in the predetermined range around the display means (for example, the TV receiving set 2 of FIG. 1) for displaying the content, based on the output from the sensor (for example, the human detecting sensor 4 of FIG. 1) for detecting the user; the second record control step (for example, step S32 of FIG. 7) of controlling the record of the operation history information (for example, the user operation history database 92 of FIG. 3) including the content specifying information for specifying the content to be operated, the operation content information showing the type of operation carried out by the user with respect to the displaying of the content, and the operation time information showing the time when the operation is carried out; and the audience-quality constituent item calculation control step (for example, step S105 of FIG. 11) of controlling the calculation of the audience-quality constituent item which constitutes the audience quality showing the quality of the content watched by the user, based on the user presence time information and operation history information which are recorded.

The recording medium according to another preferred embodiment of the present invention may have a computer program recorded therein for causing the computer cause to execute: the first record control step (for example, step S12 of FIG. 5) of controlling the record of the user presence time information (for example, the sensor information database 91 of FIG. 3) showing the time when the user is present in the predetermined range around the display means (for example, the TV receiving set 2 of FIG. 1) for displaying the content, based on the output from the sensor (for example, the human detecting sensor 4 of FIG. 1) for detecting the user; the second record control step (for example, step S32 of FIG. 7) of controlling the record of the operation history information (for example, the user operation history database 92 of FIG. 3) including the content specifying information for specifying the content to be operated, the operation content information showing the type of operation carried out by the user with respect to the displaying of the content, and the operation time information showing the time when the operation is carried out; and the audience-quality constituent item calculation control step (for example, step S105 of FIG. 11) of controlling the calculation of the audience-quality constituent item which constitutes the audience quality showing the quality of the content watched by the user, based on the user presence time information and operation history information which are recorded.

Figure 1:
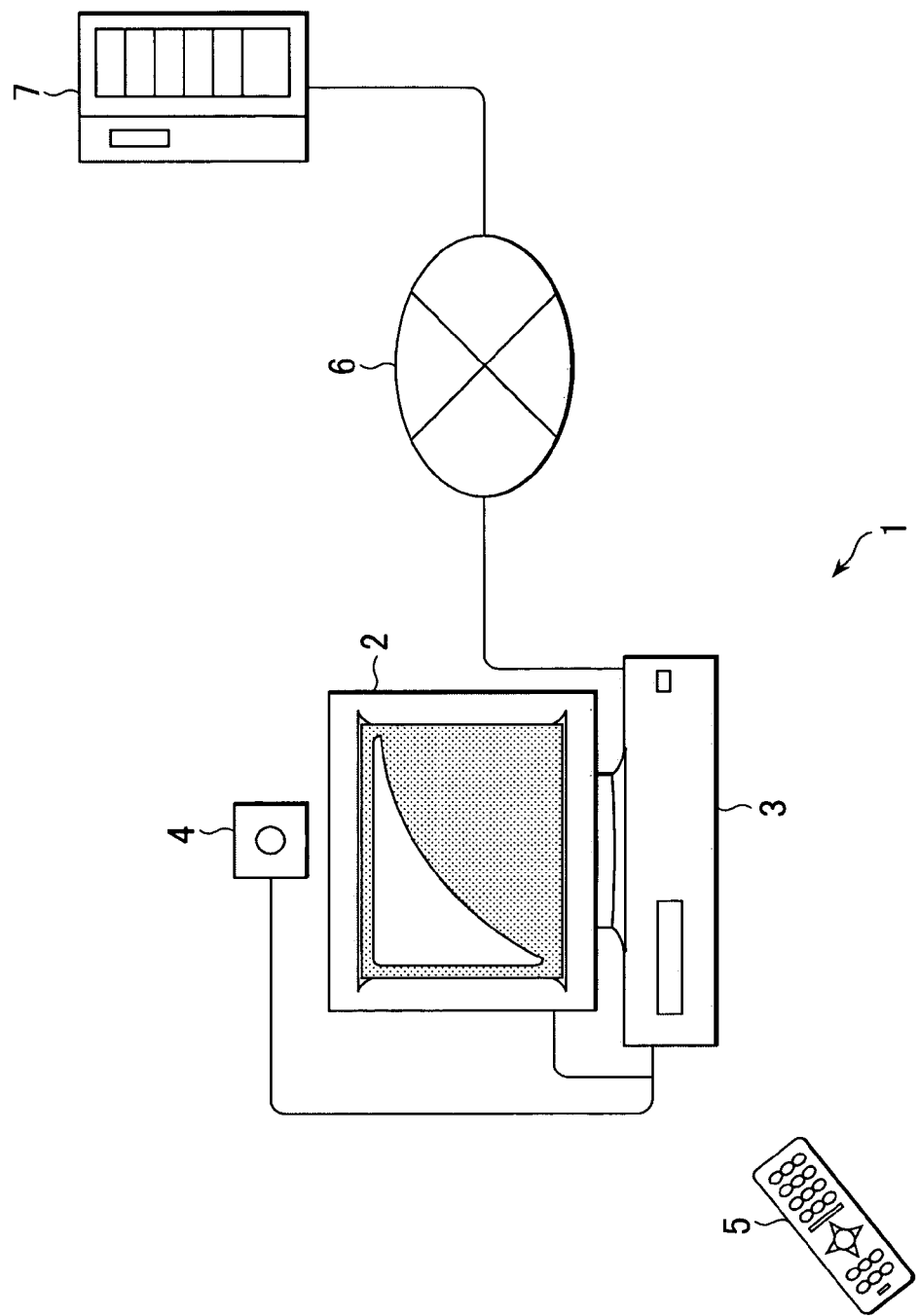
FIG. 1 is a block diagram showing an example of a structure of an audience quality investigation system to which a preferred embodiment of the present invention is applied.

Hereafter, preferred embodiments of the present invention will be described with reference to the drawings. FIG. 1 is a block diagram showing an example of a structure of an audience quality investigation system to which a preferred embodiment of the present invention is applied. A TV receiving set 2 receives and displays a broadcast program, and displays the program when the program recorded on a hard disk recorder 3 is played back. The hard disk recorder 3 is provided with an audience quality calculation function as will be described later with reference to FIG. 2, and is connected to the TV receiving set 2 and the human detecting sensor 4 by a cable etc. The hard disk recorder 3 records an operation history of the TV receiving set 2 and output information on the human detecting sensor 4. In addition, the TV receiving set 2 and the hard disk recorder 3 are operated by the user using a remote controller (remote commander) 5.

The human detecting sensor 4 is constituted by an infrared sensor etc., and outputs a signal showing that there is a person (user) if the person enters a predetermined range around the TV receiving set 2. In addition, the human detecting sensor may be constituted by other sensors which can detect the person, such as a microwave sensor, a camera, etc., or may be constructed by a combination of a plurality of these sensors.

Further, the hard disk recorder 3 is connected to the Internet 6, communicates with a server 7 over the Internet 6, and transmits (uploads) an audience quality to the server 7 at a predetermined timing. The server 7 has a storage unit constituted by a hard disk etc., and stores information transmitted from the hard disk recorder 3.

FIG. 2 is a block diagram showing an example of a structure of an audience quality calculation function 21. A network interface 41 is constituted by a modem, a terminal adopter, etc., for example, and performs a communications process through the Internet 6 etc. A storage unit 42 is constituted by a HDD (Hard Disc Drive), stores an operation history of the user by means of the remote controller 5, the information outputted from the human detecting sensor 4, and the calculated audience quality of the program, and also stores the program (data) when the program is recorded.

A secondary storage unit (or secondary recording unit) 43 is constituted by a drive equipped with a recording medium 51, such as a DVD (Digital Versatile Disc), a Blu-Ray Disc, and copies the data of the program recorded on the storage unit 42 (memory) to the recording medium 51 according to the user's instructions.

A sensor signal acquisition unit 44 acquires the signal outputted from the human detecting sensor 4, and outputs information showing time when human presence is detected (is present) to a general purpose processor 49. In addition, when the human detecting sensor 4 is constituted by a combination of a plurality of sensors, the sensor signal acquisition unit 44 acquires the signal outputted from the plurality of sensors.

A remote control receptor 45 receives a command transmitted from the remote controller 5, and outputs it to the general purpose processor 49.

A TV tuner 47 receives a signal of a broadcast TV program, and outputs a video or audio signal. A capture device 46 carries out A/D conversion of the video or audio signal, and outputs it to the storage unit 42 as a digital data. A video card 48 carries out D/A conversion of the video or audio digital data to output and display it on the TV receiving set 2.

The general purpose processor 49 is a processor, such as a CPU (Central Processing Unit) etc., and performs various types of processes based on the command outputted from the remote control receptor 45, and software, such as a computer program installed from the recording medium to be mounted in a secondary storage apparatus (secondary recording apparatus) A memory 50 is constituted by a semiconductor memory, such as a RAM (Random Access Memory) etc., in which data etc. necessary for the general purpose processor 49 to perform various types of processes are conveniently stored.

In addition, though in this example the audience quality calculation function 21 is arranged to be provided in the hard disk recorder 3, it may be provided in another apparatus (for example, the TV receiving set 2).

Next, an example of a functional structure of the software installed in the audience quality calculation function 21 will be described with reference to FIG. 3. A command execution unit 71 analyzes the command outputted from the remote control receptor 45 etc., and outputs the information (command etc.) to an audience-quality constituent item calculation unit 72.

Based on the information stored in a sensor information database 91, a user operation history database, and an EPG information database 93, an audience-quality constituent item calculation unit 72 calculates each value of a degree of expectation, a degree of concentration, and a degree of satisfaction with respect to a viewer's (user's) program, and outputs each value of the degree of expectation, the degree of concentration, and the degree of satisfaction to the audience quality generation unit 73.

The sensor information database 91 is a database for storing the information, generated when the sensor information acquisition unit 75 acquires the information outputted from the sensor signal acquisition unit 44, showing the time when human presence is detected, and is provided in the storage unit 42. The user operation history database 92 is a database for storing a user's operation history, generated such that a user's operation is detected by the operation detection unit 77 based on the information about the command outputted from the remote control receptor 45, and is provided in the storage unit 42. The EPG information database 93 is a database which stores the EPG (Electronic Program Guide) information received by the network communication unit 74 or the TV tuner 47, and is also provided in the storage unit 42.

The audience quality generation unit 73 generates a data of an audience quality such that each value of the degree of expectation, the degree of concentration, and the degree of satisfaction which are calculated by the audience-quality constituent item calculation unit 72 are made correspond to the program. The data is outputted to (stored in) the audience quality database 94 which is provided in the storage unit 42. Through the network communication unit 74, the data is uploaded to the server 7 connected to the Internet 6.

The data deletion unit 76 deletes unnecessary data out of the data stored in the sensor information database 91, the user operation history database, the EPG information database 93, and the audience quality database 94.

FIG. 4 is a block diagram showing a detailed example of a structure of the audience-quality constituent item calculation unit 72. In this example, the audience-quality constituent item calculation unit 72 is constituted by the degree-of-expectation calculation unit 111 which calculates the value of the degree of expectation, the degree-of-concentration calculation unit 112 which calculates the value of the degree of concentration, and the degree-of-satisfaction calculation unit 113 which calculates the value of the degree of satisfaction. In addition, in the preferred embodiment, it is assumed that the audience quality has at least three constituent items, the degree of expectation which is an evaluation value before watching the program, the degree of concentration which is an evaluation value during watching the program, and the degree of satisfaction which is an evaluation value after watching the program. When calculating a constituent item other than the above-mentioned three constituent items, a calculation unit for calculating a value of the constituent item is added to the audience-quality constituent item calculation unit 72.

Figure 5:
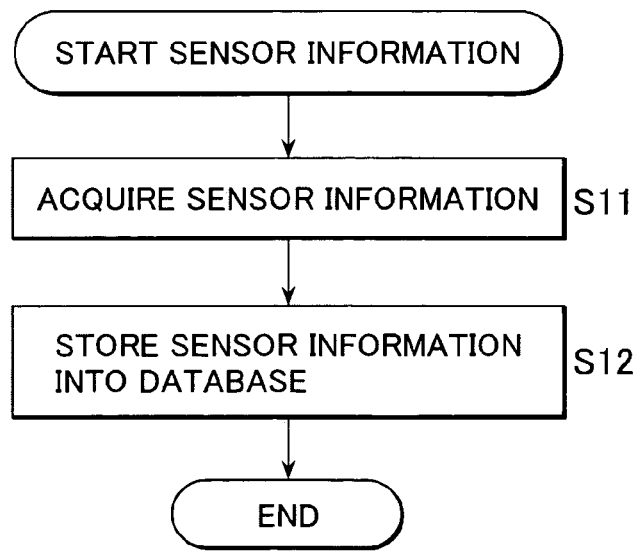
FIG. 5 is a flow chart for explaining a sensor information database generation process.

Next, with reference to a flow chart of FIG. 5, a sensor information database generation process will be described. In step S11, the sensor information acquisition unit 75 acquires the information (sensor information outputted from the human detecting sensor 4) outputted from the sensor signal acquisition unit 44. In step S12, the sensor information acquisition unit 75 stores the sensor information acquired in step S11 into the sensor information database 91.

Figures 6, 7:
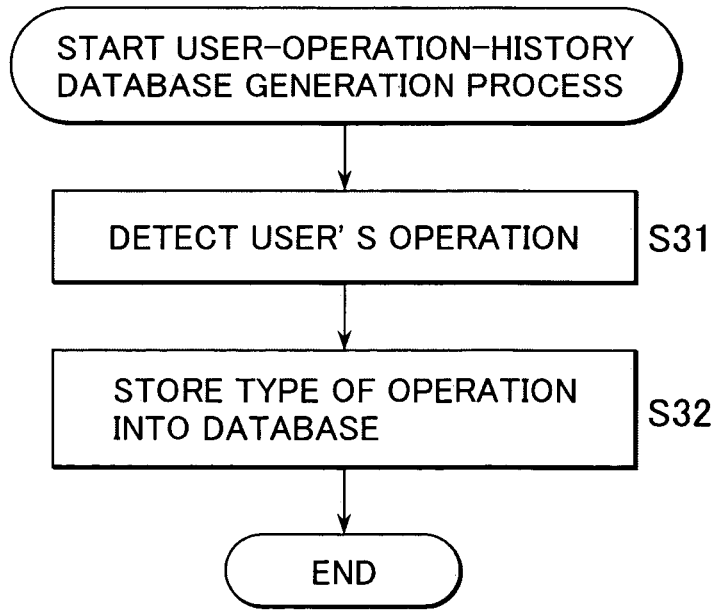
FIG. 6 is a chart showing an example of a structure of a sensor information database.
FIG. 7 is a flow chart for explaining a user-operation-history database generation process.

FIG. 6 is a chart showing an example of a structure of the thus generated sensor information database 91. As shown in this chart, human detection start time which is the time when human presence starts to be detected by the human detecting sensor 4, and human detection end time which is the time when the detection of the human presence is ended by the human detecting sensor 4 are respectively recorded in the sensor information database 91. In this example, it follows that the presence of a person (user) is detected within the predetermined range around the TV receiving set 2 in the interval between 10:10 and 11:35 on Jan. 30, 2004. It further follows that the human presence is also detected in the interval between 17:25 and 18:30 on Jan. 30, 2004 and the interval between 21:10 and 22:35 on Jan. 30, 2004.

Next, with reference to a flow chart of FIG. 7, a user-operation-history database generation process will be described. In step S31, the operation detection unit 77 detects the user's operation, such as turn-on of a power supply, a change of a channel, etc. In step S32, the operation detection unit 77 stores content of operation detected in step S31 into the user operation history database 92.

FIG. 8 shows an example of a structure of the thus generated user operation history database 92. As shown in this chart, a record number showing a number of a record stored in the user operation history database 92, date and time when the operation is carried out, the above-mentioned type of operation, and a watching program ID which is an ID for specifying the program watched by the user are recorded in the user operation history database 92. The first record (record No. 1) shows that instructions are issued to display the EPG ("Show EPG") at 9:30 on Jan. 25, 2004, and the EPG which introduces a program corresponding to a program ID "0012-20040129-000017" is displayed. The third record shows that the power supply for the TV receiving set 2 is turned on at 10:10 on Jan. 30, 2004 ("TV Power on"), and a program corresponding to a program ID "0003-20040130-000011" is displayed at this time.

The fourth record shows that a program corresponding to a program ID "0003-20040130-000012" is displayed at 10:15 on Jan. 30, 2004. Since operations by the user, such as a change of a channel, are not performed at this time, "NULL" is recorded in the "type of operation" column.

The fifth record shows that instructions are issued to switch to a channel 10 ("TV Channel 10") at 10:30 on Jan. 30, 2004, as a result a program corresponding to a program ID "0010-20040130-000015" is then displayed, the sixth and the seventh records show that operations by the user are not performed but program ID's are changed.

The eighth record shows that the power supply for the TV receiving set 2 is turned off ("TV Power off") at 11:55 on Jan. 30, 2004. Since a program is not displayed at this time, "NULL" is recorded on the watching program ID column. The ninth record shows that the power supply for the TV receiving set 2 is turned on ("TV Power on") again at 17:30 on Jan. 30, 2004.

The tenth record shows that instructions are issued to play back the program stored in the hard disk recorder 3 ("HDR Play") at 17:30 on Jan. 30, 2004, as a result the program corresponding to the program ID "0012-20040129-000017" is displayed.

After that, the eleventh through the fourteenth records show that the fact that the operation of the turn-on or the turn-off of the power supply for the TV receiving set 2, or the switching of the channel is performed is recorded together with the operation time and the program ID of the program then displayed.

Figure 9:
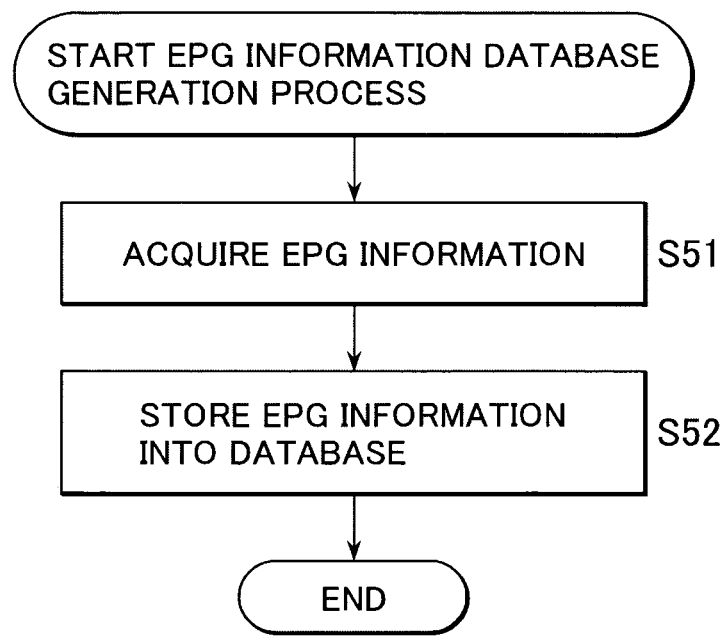
FIG. 9 is a flow chart for explaining an EPG information database generation process.

Next, with reference to a flow chart of FIG. 9, an EPG information database generation process will be described. In step S51, the network communication unit 74 acquires EPG information. In step S52, the network communication unit 74 stores the EPG information acquired in step S51 into the EPG information database 93.

FIG. 10 is a chart showing an example of a structure of the thus generated EPG information database 93. As shown in this chart, the program ID which specifies the program, the start time and end time of the program, the channel through which that the program is broadcast, and a title of the program are recorded in the EPG information database 93. For example, the first record shows that a program corresponding to the program ID "0012-20040129-000017" has a title "000", and is broadcast through a channel 12 from 3:00 to 4:00 on Jan. 29, 2004. Subsequently, a program ID of each program, start time and end time of the program, a channel through which the program is broadcast, and a title of the program are described in a similar way.

Next, with reference to a flow chart of FIG. 11, an audience quality calculation process using the hard disk recorder 3 (audience quality calculation function 21) will be described. This process may be performed at predetermined intervals (for example, once a day), or may be performed based on the user's instructions.

In step S101, the audience quality calculation item generation unit 72 specifies a program ID of a target program based on the user operation history database 92. For example, in the user operation history database 92 of FIG. 8, since the program watched first is the program corresponding to the program ID "0003-20040130-000011", the program ID "0003-20040130-000011" is specified.

In step S102, the audience quality calculation item generation unit 72 acquires the start time and end time of the target program based on the EPG information database 93. As the start time of the program corresponding to the program ID "0003-20040130-000011", "10:00 on Jan. 30, 2004" is acquired, and as the end time "10:15 on Jan. 30, 2004" is acquired from the EPG information database 93 of FIG. 10.

In step S103, the audience quality calculation item generation unit 72 reads the operation history about the target program from the user operation history database 92, and sets a value 0 to a variable N in step S104, where it is assumed that the variable N specifies a type of a constituent item of the audience quality, and takes a value between 0 and Nmax-1. Nmax is a value which is preset as a value showing a number of the constituent items of the audience quality. For example, when the audience quality is constituted by three constituent items, the degree of expectation, the degree of concentration, and the degree of satisfaction, a value 3 is set to Nmax.

In step S105, the audience quality calculation item generation unit 72 performs an audience quality constituent item (N) value computation. Details of the audience quality constituent item (N) value computation will be described later with reference to FIGS. 12 through 14, whereby the value of the degree of expectation, the degree of concentration, or the degree of satisfaction of the target program is calculated. Then, the process moves to step S106.

In step S106, the audience quality calculation item generation unit 72 determines whether or not the value of the variable N is smaller than the value Nmax. When it is determined that the value of the variable N is smaller than the value Nmax, the process moves to step S107, the value of the variable N is incremented by 1, the process returns to step S105. Thus, for example, when N=0 the value of the degree of expectation is computed in step S105. When N=1, the value of degree of concentration is computed in step S105. When N=2, the value of the degree of satisfaction is computed in step S105. When N=3, it is determined in step S106 that the value of the variable N is not smaller than the value Nmax, and the process moves to step S108.

In step S108, the audience quality generation unit 73 stores an audience quality data into the audience quality database 94, the data being matched to the target program. At this time, being matched to the target program's program ID "0003-20040130-000011", each value of the degree of expectation, the degree of concentration, and the degree of satisfaction which are computed by way of the audience quality constituent item (N) value computation in step S105 is stored as the audience quality data.

In step S109, the audience quality generation unit 73 determines whether all the programs watched by the user are checked or not. When it is determined not to have checked all the programs yet, the process returns to step S1. In the user operation history database 92 of FIG. 8, since the program which is watched following the program corresponding to the program ID "0003-20040130-000011" is a program corresponding to the program ID "0003-20040130-000012", the target program's program ID is specified as the ID "0003-20040130-000012" in step S101, and the subsequent processes are repeatedly performed.

In step S109, when it is determined that all the programs watched by the user are checked, the process moves to step S110, and the network communication unit 74 transmits and uploads the audience quality data stored in step S108 to the audience quality server 7 through the Internet 6.

Thus, the audience quality of the program watched by the user is calculated. In the above-mentioned audience quality calculation process, since the user does not have to input the evaluation or does not have to perform a special operation, the audience quality can be automatically calculated, without placing a burden on the user. Further, since the user does not particularly need to wear a sensor etc. in the case of watching the program, the user can comfortably enjoy watching the program.

Next, with reference to a flow chart of FIG. 12, the degree-of-expectation calculation process will be described which is a first example of the audience quality constituent item (N) value computation of step S105 of FIG. 11. This process is performed in step S105, when the value of the variable N is 0 in the audience quality calculation process of FIG. 11.

In step S131, the degree-of-expectation calculation unit 111 sets an initial value 0 to a variable "e" showing the degree of expectation.

In step S132, the degree-of-expectation calculation unit 111 determines whether or not the EPG of the target program was displayed in the past based on the user operation history database 92. At this event, the degree-of-expectation calculation unit 111 searches the user operation history database 92 of FIG. 8 for a history of the display of EPG, i.e. a record (first record) in which the type of operation is "Show EPG", and checks whether or not the watching program ID of the record is equal to the target program's program ID.

Now, it is assumed that the target program is a program corresponding to the program ID "0003-20040130-000011". Unlike the target program's program ID, since the watching program ID of the first record of FIG. 8 in which the type of operation is "Show EPG" is not another record in which the type of operation is "Show EPG", it is determined in step S132 that the EPG of the target program was not displayed in the past, and the process in step S133 to be described later is skipped. Without incrementing the value of the variable "e", the process moves to step S134.

On the other hand, in step S132, when it is determined that the EPG of the target program was displayed in the past, the process moves to step S133 and the degree-of-expectation calculation unit 111 increments the value of the variable "e" by 1. Since it is considered that the user was interested in the program when the EPG introducing the target program was displayed in the past, a point is added to the degree of expectation.

In step S134, the degree-of-expectation calculation unit 111 determines whether or not the watching of the target program is watching by way of playback of a recorded content (program). At this time, the degree-of-expectation calculation unit 111 searches the user operation history database 92 of FIG. 8 for a playback history of the recorded content i.e. a record (tenth record) in which the type of operation is "HDR Play", and checks whether or not the watching program ID of the record is equal to the target program's program ID. Now, it is assumed that the target program is a program corresponding to the program ID "0003-20040130-000011". Unlike the target program's program ID, since the watching program ID of the tenth record of FIG. 8 in which the type of operation is "HDR Play" is not another record in which the type of operation is "HDR Play", in step S134, it is determined not to be the watching by way of playback of the recorded content (program), and the process moves to step S135.

In step S135, the degree-of-expectation calculation unit 111 determines whether or not the channel has been used for watching before the target program broadcast starts. For example, now, assuming that the target program is a program corresponding to the program ID "0003-20040130-000011", the degree-of-expectation calculation unit 111 searches the EPG information database 93 of FIG. 10 for a record in which a program ID is "0003-20040130-000011". Based on the record, it acquires the start time (in this case, 10:00 on Jan. 30, 2004) of the target program. Further, the record in which the watching program ID is "0003-20040130-000011" is retrieved from the user operation history database 92 of FIG. 8. Based on the record (in this case, third record), it is confirmed that the target program is watched from 10:10 on Jan. 30, 2004. Therefore, in step S135, it is determined that the channel has not been used for watching before the target program broadcast starts. The process of step S136 to be described later is skipped, the value of the variable "e" is not incremented, and the process moves to step S137.

On the other hand, in step S135, when it is determined that the channel has been used for watching before the target program broadcast starts, the process moves to step S136. The degree-of-expectation calculation unit 111 increments the value of the variable "e" by 1. Since it is considered that the user has been waiting for the program broadcast to start when it is determined that the channel has been used for watching before the target program broadcast starts, a point is added to the degree of expectation.

In step S137, the degree-of-expectation calculation unit 111 determines whether or not a person has been detected before the target program broadcast starts. At this time, the degree-of-expectation calculation unit 111 compares the broadcast start time of the target program with the time when human presence is detected by the human detecting sensor 4 with reference to the sensor information database 91 of FIG. 5. Now, supposing the target program is a program corresponding to the program ID "0003-20040130-000011", it is seen that the start time of the target program is 10:00 on Jan. 30, 2004 from the EPG information database 93 of FIG. 10, and that, from the sensor information database 91 of FIG. 6, the person has been detected since 10:10 on Jan. 30, 2004. Therefore, in step S137, it is determined that the person has not been detected before the target program broadcast starts, and the process moves to step S139.

On the other hand, in step S137, when it is determined that the person was detected before the target program broadcast starts, the process moves to step S138, and the degree-of-expectation calculation unit 111 increments the value of the variable "e" by 1. Since it is considered that the user has been waiting for the program broadcast to start when it is determined that the human presence was detected before the target program broadcast starts, a point is added to the degree of expectation.

In step S139, the degree-of-expectation calculation unit 111 determines whether or not a recording reservation of the target program is performed. At this event, the degree-of-expectation calculation unit 111 searches the user operation history database 92 of FIG. 8 for a history of content (program) recording reservations i.e., a record (not described in this example) in which the type of operation is "HDR Rec", and checks whether or not the watching program ID of the record is equal to the target program's program ID. Since the record (history of content recording) in which the type of operation is "HDR Rec" does not now remain in the user operation history database 92 of FIG. 8, it is determined in step S139 that the recording reservation of the target program has not been made. The process of step S140 as will be described later is skipped, the value of the variable "e" is not incremented, and the process moves to step S142.

On the other hand, in step S139, when it is determined that the recording reservation of the target program has been made, the process moves to step S140, and the degree-of-expectation calculation unit 111 increments the value of the variable "e" by 1. Since it is considered that the user shows expectation to the program when it is determined that the recording reservation of the target program is made, a point is added to the degree of expectation.

Further, in step S134, when it is determined that watching the target program is watching by way of playback of the recorded content (program), the process moves to step S141, the degree-of-expectation calculation unit 111 increments the value of the variable "e" by 3, and the process moves to step S142. Since it is considered that the user is highly interested in the program when it is determined that the target program is watched by way of playback of the recorded content (program), points of the degree of expectation are considerably increased.

In step S142, the degree-of-expectation calculation unit 111 divides the value of the variable "e" by 4, and normalizes it. Now, the degree of expectation is e=0/4=0 when the target program is a program corresponding to the program ID "0003-20040130-000011". Normalization in this way allows the value of the degree of expectation to be between 0 and 1, and it is possible to easily generate the data of audience quality, compare the data, etc.

Thus, the degree of expectation which is one of the constituent items of audience quality is calculated. The degree of expectation is used as a constituent item of the audience quality showing how much expectation there is with respect to the content before the user watches it.

Next, with reference to a flow chart of FIG. 13, a degree-of-concentration calculation process which is a second example of the audience quality constituent item (N) value computation of step S105 of FIG. 11 will be described. In the audience quality calculation process of FIG. 11, this process is performed in step S105, when the value of the variable N is 1.

In step S161, the degree-of-concentration calculation unit 112 sets an initial value 0 as a variable "c" showing the degree of concentration.

In step S162, the degree-of-concentration calculation unit 112 detects CM broadcasting times within the target program. Although it is thought that the detection of the CM broadcasting times may be carried out by adopting various methods, it is assumed that, in this case, times (start time and end time) when a CM is broadcast within a broadcast program are detected based on stereo or monophonic broadcasting periods of time, for example, and such times are stored beforehand in the storage unit 42.

In step S163, the degree-of-concentration calculation unit 112 determines whether or not the watching of the target program is watching by way of playback of the recorded content (program). At this event, the degree-of-concentration calculation unit 112 searches the user operation history database 92 of FIG. 8 for the playback history of recorded content, and checks whether or not the watching program ID of the record is equal to the target program's program ID. For example, it is now assumed that the target program is a program corresponding to the program ID "0003-20040130-000011". Unlike the target program's program ID, since the watching program ID of the tenth record of FIG. 8 in which the type of operation is "HDR Play", is not another record in which the type of operation is "HDR Play", it is determined in step S163 that it is not the watching by way of playback of recorded content (program), and the process moves to step S164.

In step S164, the degree-of-concentration calculation unit 112 calculates a zapping time t2 within the target program. The zapping time t2 (minutes) is the time when the program of another channel is displayed during watching the target program (under broadcast), and is calculated based on the record of the user operation history database 92. However, even if the program of another channel is displayed during watching the target program (under broadcast), when the times overlap with the CM broadcasting times detected in step S162, they are not included in the zapping time t2.

Now, supposing the target program is a program corresponding to the program ID "0003-20040130-000011", according to the user history database 92 of FIG. 8, the program of another channel is not displayed during broadcast of the program (according to the EPG information database 93 of FIG. 10, the start time and end time of the record in which the program ID is "0003-20040130-000011" are respectively 10:00 and 10:15 on Jan. 30, 2004), so that the degree-of-concentration calculation unit 112 calculates the zapping time t2, which results in 0.

In step S165, the degree-of-concentration calculation unit 112 subtracts the zapping time t2 from the variable "c". Since it is considered that the longer the zapping time is, the less the user is concentrated on the target program, points of degree of concentration are subtracted by the amount of zapping time, for example.

On the other hand, in step S163, when it is determined that the watching of the target program is watching by way of playback of the recorded content (program), the process moves to step S166 and the degree-of-concentration calculation unit 112 calculates the time t3 (minutes) skipped using fast forward. For example, it is assumed that the time t3 skipped using fast forward is calculated based on the operation history recorded in the user history database 92. However, even if skipped using fast forward, when the times overlap with the CM broadcasting times detected in step S162, they are not included in the time t3.

In step S167, the degree-of-concentration calculation unit 112 subtracts the time t3 skipped using fast forward from the variable "c". Since it is considered that the longer the skipped time by way of fast forward is, the less the user is concentrated on the target program, points of degree of concentration are subtracted by the amount of skipped time.

In step S168, the degree-of-concentration calculation unit 112 adds a broadcasting time T (minutes) of the target program to the variable "c". Supposing the target program is the program corresponding to the program ID "0003-20040130-000011", the broadcasting time T of the program is 15 minutes, which gives c=0+15 (minutes).

In step S169, the degree-of-concentration calculation unit 112 divides the value of the variable "c" by the broadcasting time T of the program, and normalizes it. When the target program is the program corresponding to the program ID "0003-20040130-000011", the degree of expectation is c=15/15=1.

Thus, the degree of concentration which is one of the constituent items of the audience quality is calculated. The degree of concentration is used as a constituent item of the audience quality showing how much the user is concentrated on watching the content.

Next, with reference to a flow chart of FIG. 14, a degree-of-satisfaction calculation process which is a third example of the audience quality constituent item (N) value computation of step S105 of FIG. 11 will be described. For example, in step S105 this process is performed in the audience quality calculation process of FIG. 11, when the value of the variable N is 2.

In step S191, the degree-of-satisfaction calculation unit 113 sets an initial value 0 as a variable "s" showing the degree of satisfaction.

In step S192, the degree-of-satisfaction calculation unit 113 determines whether or not the watching of the target program is watching by way of playback of the recorded content (program). At this time, the degree-of-satisfaction calculation unit 113 searches the user operation history database 92 of FIG. 8 for the playback history of recorded content, and checks whether or not the watching program ID of the record is equal to the target program's program ID. For example, it is now assumed that the target program is the program corresponding to the program ID "0003-20040130-000011". Since the watching program ID of the tenth record of FIG. 8 in which the type of operation is "HDR Play" is different from the target program's program ID, it is determined not to be the watching by way of playback of recorded content (program) in step S192, and the process moves to step S193.

In step S193, the degree-of-satisfaction calculation unit 113 determines whether or not the target program is watched until m-minutes before the end time of the target program. Here, the value of m is preset. For example, it is set to 1 (minute).

Now, it is assumed that the target program is the program corresponding to the program ID "0003-20040130-000011". According to the user history database 92 of FIG. 8, based on the third record in which the watching program ID is "0003-20040130-000011" and the following fourth record, the degree-of-satisfaction calculation unit 113 checks that the target program was watched until 10:15 on Jan. 30, 2004, which is the end time of the target program. Therefore, in step S193, the target program is determined to have been watched until one minute before the end time of the target program, the process moves to step S194, and the degree-of-satisfaction calculation unit 113 increments the value of the variable "s" by 1. When the target program is determined to have been watched until one minute before end time, since it is considered that the user was substantially watching the program until the last time, and the user was satisfied with the program, then a point is added to the degree of satisfaction.

On the other hand, in step S193, when the target program is determined not to have been watched until m-minutes before the end time of the target program, the process of step S194 is skipped, the value of the variable "s" is not incremented, and the process moves to step S195.

In step S195, the degree-of-satisfaction calculation unit 113 determines whether or not human presence is detected when the target program is ended. At this event, the degree-of-satisfaction calculation unit 113 compares the broadcast end time of the target program with the time when human presence is detected by the human detecting sensor 4 with reference to the sensor information database 91 of FIG. 6.

Now, supposing the target program is the program corresponding to the program ID "0003-20040130-000011", the broadcast end time of the target program is 10:15 on Jan. 30, 2004, and the sensor information database 91 of FIG. 6 shows that human presence is detected in the interval between 10:10 and 11:55 on Jan. 30, 2004. Therefore, in step S195, it is determined that human presence is detected when the broadcast of the target program is ended, the process moves to step S196, and the degree-of-satisfaction determination unit 113 increments the value of the variable "s" by 1. Since it is considered that the user is satisfied with the program when it is determined that human presence is detected at the end of the broadcast, a point is added to the degree of satisfaction.

On the other hand, in step S195, when it is determined that the person is not detected at the end of the target program, the process of step S196 is skipped, the value of the variable "s" is not incremented, and the process moves to step S197.

In step S197, the degree-of-satisfaction calculation unit 113 divides the value of the variable "s" by 2, and normalizes it. When the target program is the program corresponding to the program ID "0003-20040130-000011", the degree of satisfaction is s=(1+1)/2=1.

On the other hand, since the watching program ID of the tenth record of the user operation history database 92 of FIG. 8 is equal to the target program's program ID when, for example, the target program is the program corresponding to the program ID "0012-20040129-000017", it is determined in step S92 that it is watching by way of playback of the recorded content (program), and the process moves to step S198.

In step S198, the degree-of-satisfaction calculation unit 113 determines whether or not it was played back until m-minutes before the target program was ended. Here, it is assumed that m is also preset as 1 (minute).

In this case, according to the EPG information database 93 of FIG. 10, the degree-of-satisfaction calculation unit 113 checks that the target program (record which has the program ID "0012-20040129-000017") is a one-hour program whose start time is 3:00 on Jan. 29, 2004 and whose end time is 4:00. Further, according to the user operation history database 92 (record in which the watching program ID is "0012-20040129-000017" and the type of operation is "HDR Play") of FIG. 8, it is confirmed that the target program playback was started at 17:30 on Jan. 30, 2004 and played back until the power supply for the TV receiving set 2 was turned off at 18:30 on Jan. 30, 2004.

Therefore, it is determined that the target program was played back for one hour until one minute before the target program was ended in step S198, the process moves to step S199, and the degree-of-satisfaction determination unit 113 increments the value of the variable "s" by 1. Since it is considered that the user was substantially watching the program until the last time and the user was satisfied with the program when it is determined to have been played back one minute before the target program was ended, a point is added to the degree of satisfaction.

On the other hand, in step S198, when it is determined not to have been played back m-minutes before the target program was ended, the process of step S199 is skipped, the value of the variable "s" is not incremented, and the process moves to step S200.

In step S200, the degree-of-satisfaction calculation unit 113 determines whether or not human presence is detected at the end of the target program. At this time, with reference to the sensor information database 91 of FIG. 6, the degree-of-satisfaction calculation unit 113 compares the end time of the target program with the time when human presence is detected by the human detecting sensor 4.

Now, supposing the target program is a program corresponding to the program ID "0012-20040129-000017", the (playback) end time of the target program is 18:30 on Jan. 30, 2004, and the degree-of-satisfaction calculation unit 113 checks that human presence is detected in the interval between 17:15 and 18:30 on Jan. 30, 2004 according to the sensor information database 91 of FIG. 6. Therefore, in step S200, it is determined that human presence is detected when the target program is ended, the process moves to step S201, and the degree-of-satisfaction calculation unit 113 increments the value of the variable "s" by 1. Since it is considered that the user is satisfied with the program when it is determined that human presence is detected at the end of the playback of the program, a point is added to the degree of satisfaction.

On the other hand, in step S200, when it is determined that the person is not detected at the end of the target program, the process of step S201 is skipped, the value of the variable "s" is not incremented, and the process moves to step S202.

In step S202, the degree-of-satisfaction calculation unit 113 determines whether or not the recorded target program is deleted. In this case, the degree-of-satisfaction calculation unit 113 searches the user operation history database 92 of FIG. 8, and checks that a record of the operation history indicating that the program of the program ID "0012-20040129-000017" is deleted is not recorded. Therefore, instep S202, it is determined that the recorded target program is not deleted, the process moves to step S203, and the degree-of-satisfaction calculation unit 113 increments the value of the variable "s" by 1. Since it is considered that the user is satisfied with the program when it is determined that the recorded target program is not deleted, a point is added to the degree of satisfaction.

On the other hand, when the record of the operation history (although not described here, type of operation "HDR del") indicating that the target program is deleted is recorded in the user operation history database 92 of FIG. 8, it is determined in step S202 that the recorded target program is deleted, the process of step S203 is skipped, the value of the variable "s" is not incremented, and the process moves to step S204.

In step S204, the degree-of-satisfaction calculation unit 113 determines whether or not the recorded target program is saved in a recording medium, such as DVD. In this case, the degree-of-satisfaction calculation unit 113 searches the user operation history database 92 of FIG. 8, and checks that a record of the operation history indicating that the program of the program ID "0012-20040129-000017" is saved in the recording medium is not recorded. Therefore, in step S204, it is determined that the recorded target program is not saved in the recording medium, the process of step S205 as will be described later is skipped, the value of the variable "s" is not incremented, and the process moves to step S206.

On the other hand, when the record of an operation history (although not described here, type of operation "HDR copy") indicating that the target program is saved in the recording medium is recorded, it is determined in step S204 that the recorded target program is saved in the recording medium, the process moves to step S205, and the degree-of-satisfaction calculation unit 113 increments the value of the variable "s" by 1. Since it is considered that the user is satisfied with the program when it is determined that the recorded target program is saved in the recording media, such as DVD, and a point is added to the degree of satisfaction.

In step S206, the degree-of-satisfaction calculation unit 113 divides the value of s by 4, and normalizes it. When the target program is the program corresponding to the program ID "0012-20040129-000017", the degree of satisfaction is s=(1+1+1+0)/4=0.75.

In this way, the degree of satisfaction which is one of the constituent items of audience quality is calculated. The degree of concentration is used as a constituent item of the audience quality showing how much the user is satisfied after watching the content.

In step S108 of FIG. 11, each value of the thus calculated degree of expectation, degree of concentration, and degree of satisfaction is matched to the target program's program ID, and is stored in the audience quality database 94 as the audience quality data.

FIG. 15 is a chart showing an example of a structure of the audience quality database 94. As shown in this chart, the audience quality database 94 is constituted by the program ID and the audience-quality constituent item (N) values matched to the program ID, (N=0, 1, 2, ... ). Here, an audience-quality constituent item (0) value represents a value of the degree of expectation, an audience-quality constituent item (1) value represents a value of the degree of concentration, and an audience-quality constituent item (2) value represents a value of the degree of satisfaction. When the audience quality (data) has an audience-quality constituent item other than the degree of expectation, the degree of satisfaction, and the degree of concentration, it is recorded in the audience quality database 94 as an audience-quality constituent item (3) value, an audience-quality constituent item (4) value, and so on.

Figure 12:
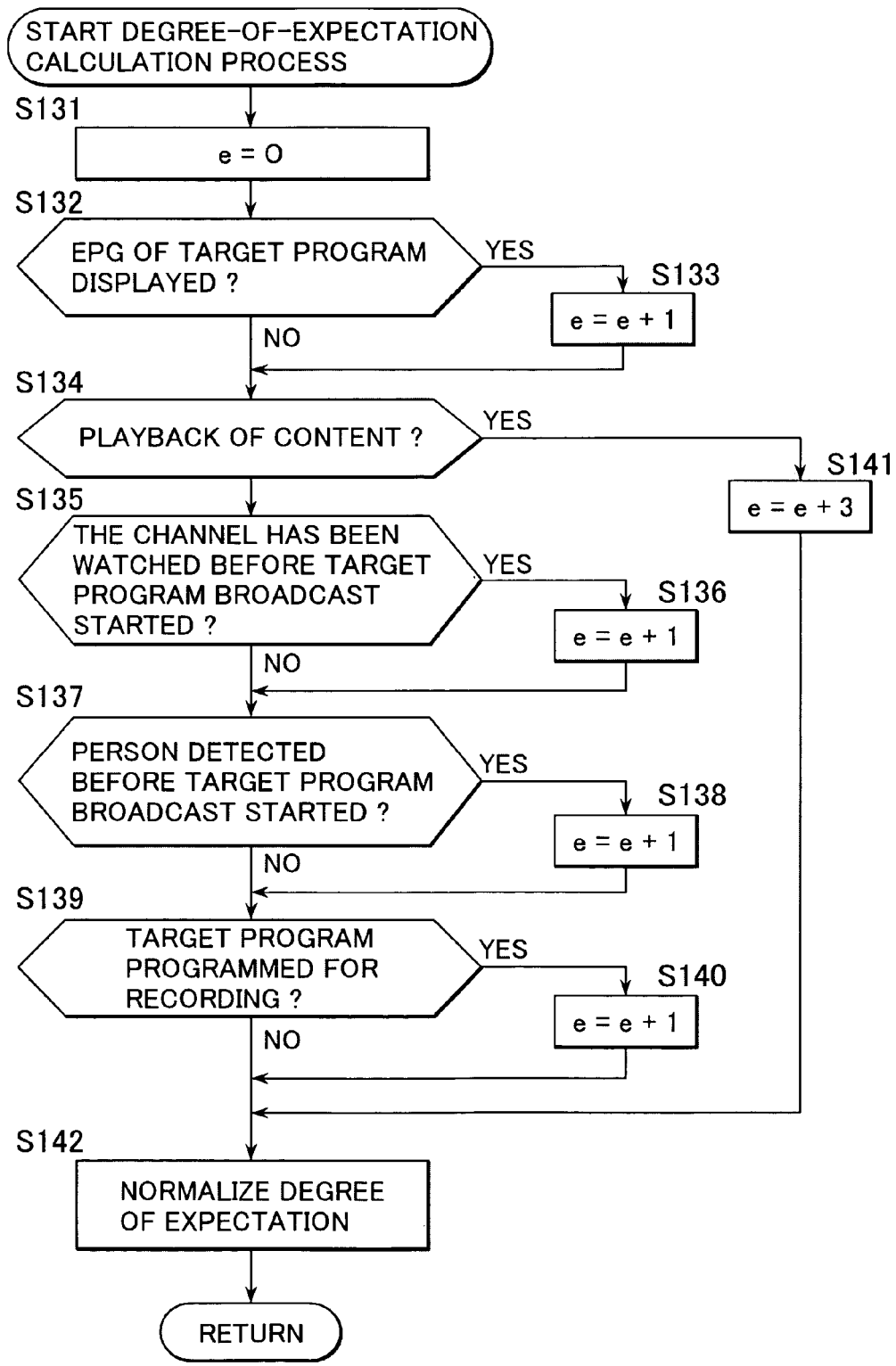
FIG. 12 is a flow chart for explaining a degree-of-expectation calculation process.
Figure 13:
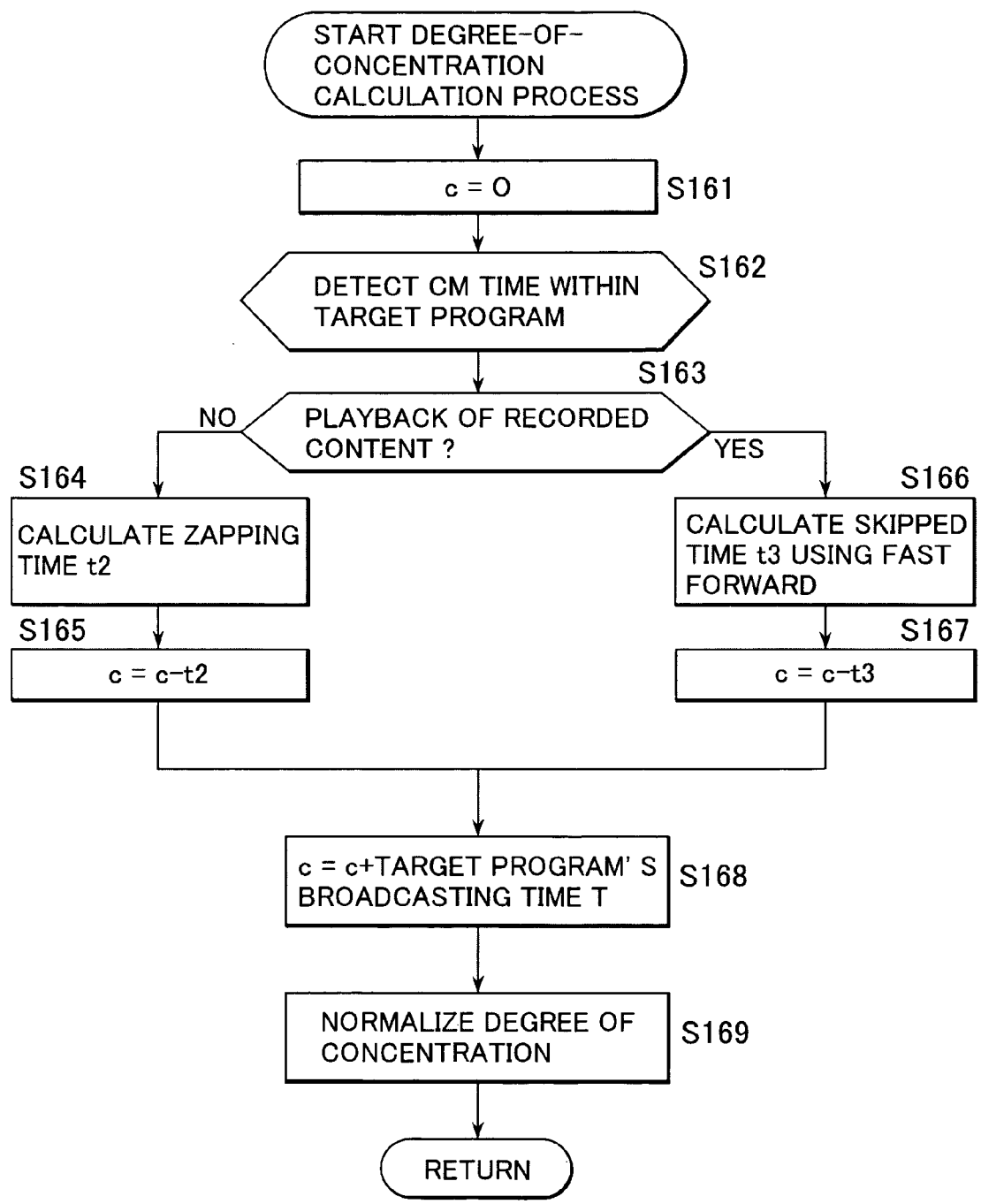
FIG. 13 is a flow chart for explaining a degree-of-concentration calculation process.
Figure 14:
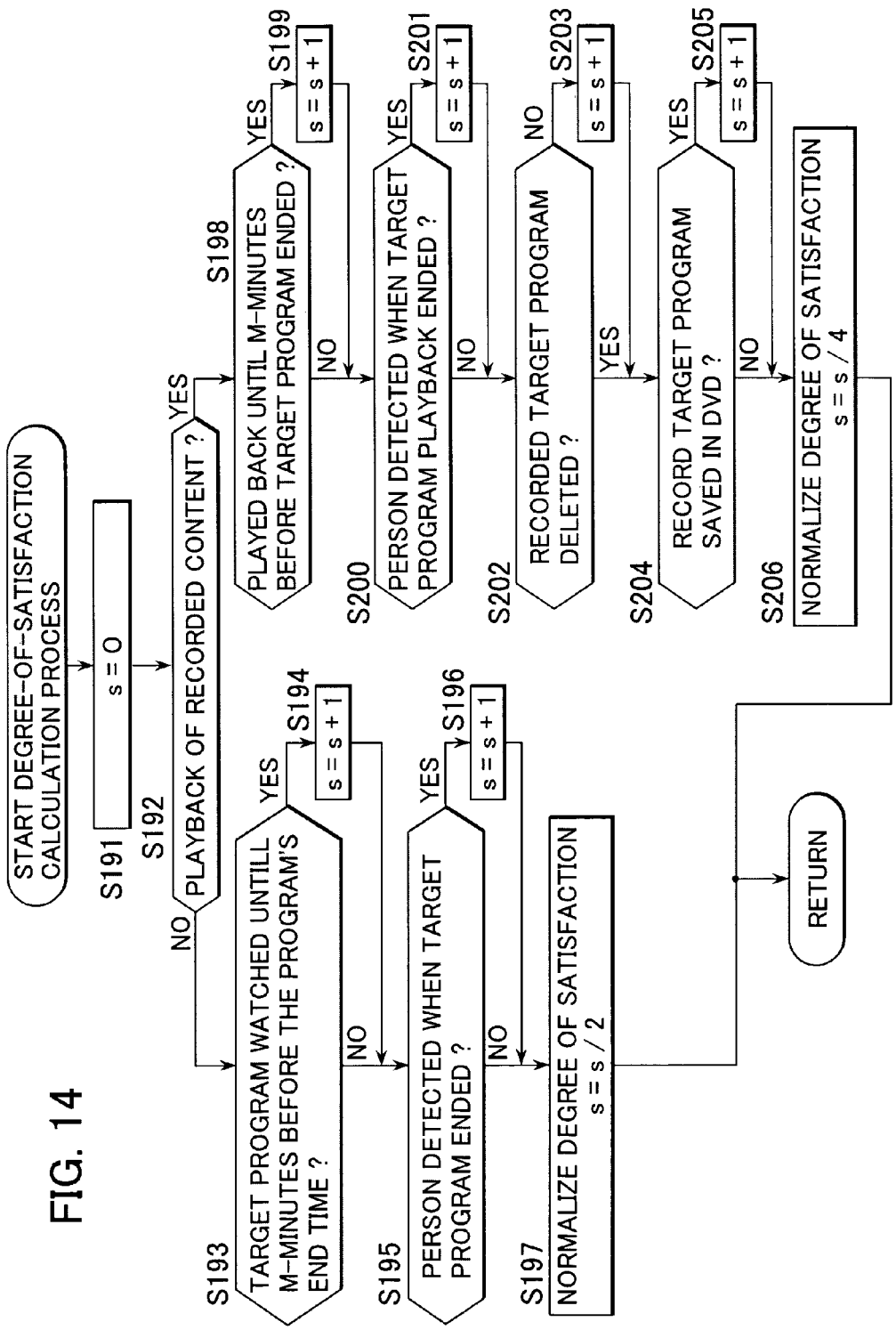
FIG. 14 is a flow chart for explaining a degree-of-satisfaction calculation process.

In this example, the values (the audience-quality constituent item (0) values, the audience-quality constituent item (1) values, and the audience-quality constituent item (2) values) of the degrees of expectation, the degrees of concentration, and the degrees of satisfaction of the programs corresponding to the program ID's "0003-20040130-000011" and "0003-20040130-000012", are calculated and recorded with reference to FIGS. 12 through 14, as described above.

Then in step S110 of FIG. 11, the audience quality data recorded on the audience quality database 94 are transmitted to the audience quality server 7, and uploaded.

The so generated audience quality data are acquired by a TV station and the like, from the audience quality server 7 through the Internet 6, for example, and used for evaluation, description, etc. of the program. Further, when the hard disk recorder 3 has the function for recommending a program to the user, the audience quality data can also be used as criteria for selecting the program to recommend.

By the way, since the capacity of the storage unit 42 is limited, the data stored in the above-mentioned sensor information database 91, the user operation history information database 92, the EPG information database 93, and the audience quality database 94 are deleted by way of a data deletion process as will be described later, after the audience quality is calculated. The data deletion process will be described with reference to a flow chart of FIG. 16. For example, this process is performed once (at midnight etc.) a day, after the audience quality is calculated by the audience quality calculation process of FIG. 11.

In step S251, the data deletion unit 76 deletes a data of the sensor information database 91. After calculating the audience quality of the day, the data of the sensor information database 91 is deleted, since it is not particularly used.

Figure 17:
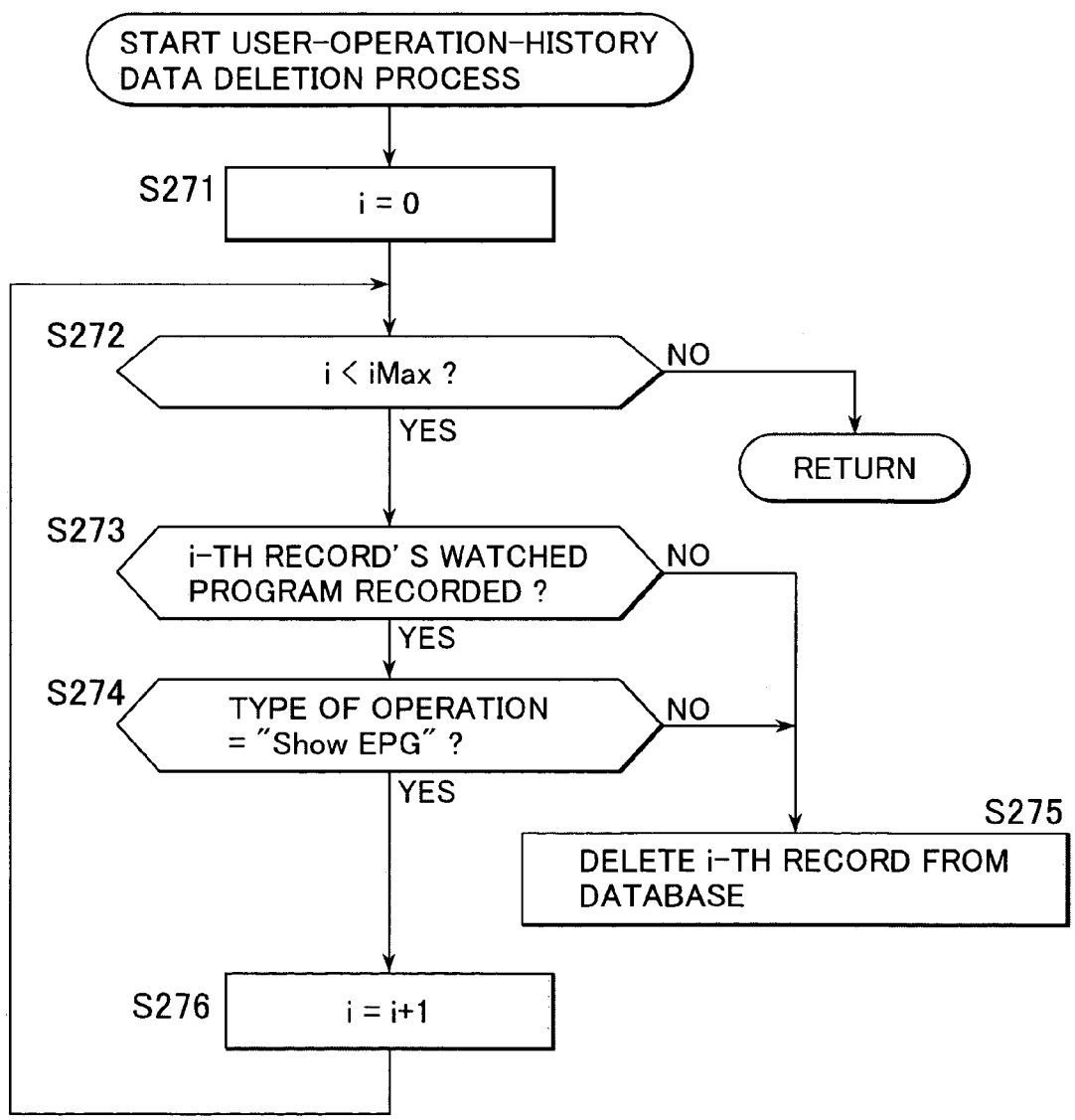
FIG. 17 is a flow chart for explaining a user-operation-history data deletion process.

In step S252, the data deletion unit 76 performs a user-operation-history data deletion process as will be described later with reference to FIG. 17, whereby a data which is not particularly used is deleted from the user operation history database 92 after calculating the audience quality of the day.

In step S253, the data deletion unit 76 deletes the data of the EPG information database 93 except for the record of EPG of the recorded content (program).

In step S254, the data deletion unit 76 deletes the data of the audience quality database 94. As described above, the audience quality data recorded on the audience quality database 94 is transmitted to the audience quality server 7 in step S110 of FIG. 11, and uploaded, then deleted. In addition, since the audience quality data can also be used as criteria for selecting the program to recommend when the hard disk recorder 3 has the function for recommending a program to the user, the data of the audience quality database 94 may be arranged to be deleted except for the audience quality data of the recorded program in step S254.

Thus, the unnecessary data is deleted from the data stored in the storage unit 42.

Figure 16:
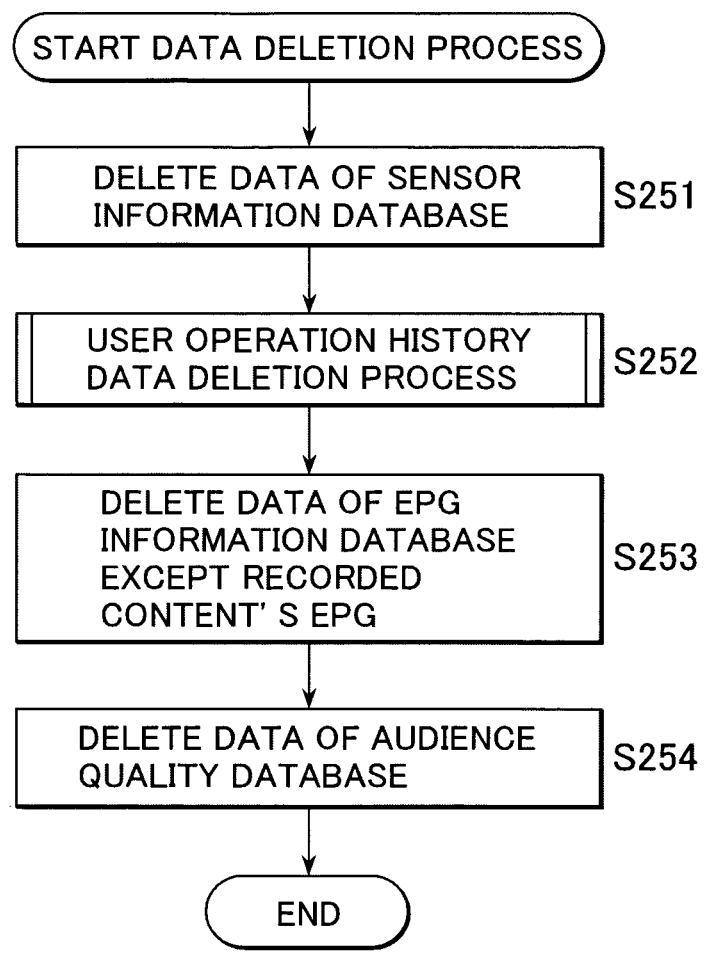
FIG. 16 is a flow chart for explaining a data deletion process.

Next, with reference to a flow chart of FIG. 17, a user-operation-history data deletion process of step S252 of FIG. 16 will be described in detail.

In step S271, the data deletion unit 76 sets an initial value 0 as a variable "i". In step S142, the data deletion unit 76 determines whether or not the variable "i" is smaller than a value iMax. When it is determined that the variable "i" is smaller than the value iMax, the process moves to step S273. In addition, it is assumed that the value iMax is the maximum value of the data (record) of the operation history recorded in the user operation history database 92.

In step S273 the data deletion unit 76 determines whether or not a watching program (program corresponding to the program ID) of the i-th record in the user operation history database 92 is recorded. When it is determined that the watching program of the i-th record is not recorded, the process moves to step S145, and the data deletion unit 76 deletes the i-th record from the user operation history database 92. After calculating the audience quality of the day, the operation history of the content which is not recorded is deleted, since it is not particularly used.

On the other hand, when it is determined in step S273 that the watching program of the i-th record is recorded, the data deletion unit 76 determines in step S274 whether or not the type of operation of the i-th record is "ShowEPG".

In step S274, when it is determined that the type of operation of the i-th record is "ShowEPG", the process moves to step S276 and increments the value of the variable "i" by 1. Even after calculating the audience quality of the day, the record in which the watching program is the recorded content (program) and the type of operation is "ShowEPG" is not deleted, since it may be used in the degree-of-expectation calculation process (step S132 of FIG. 12).

On the other hand, in step S274, when it is determined that the type of operation of the i-th record is not "ShowEPG", the process moves to step S275. The data deletion unit 76 deletes the i-th record, and the process moves to step S276. Even if the watching program is the recorded content (program), the record in which the type of operation is not "ShowEPG" is deleted after calculating the audience quality of the day, since it is not particularly used.

After processing in step S276, the process returns to step S272, and the subsequent processes are repeatedly performed. Then, in step S142, when it is determined that the variable "i" is not smaller than the value iMax, the user-operation-history data deletion process is ended.

Thus, after checking all the records (data) of the user operation history database 92 and calculating the audience quality of the day, the record that is not particularly used is deleted.

The above-mentioned series of processes may be realized either by means of hardware or by way of software. When the above-mentioned series of processes are executed by the software, a program which constitutes the software is installed through the network or the recording medium 51 consisting of a removable media etc.

In addition, in the present specification, the steps of performing the above-mentioned series of processes may include not only the processes performed in sequence in accordance with the described order but also the processes performed in parallel or individually, so that the steps may not necessarily be processed in sequence.

Therefore, although the preferred embodiments of the present invention are particularly described above, the present invention is not limited to the above-mentioned preferred embodiments. It will be obvious to those skilled in the art that various changes, modifications, combinations, sub combinations and alterations may be made depending on design requirements and other factors insofar as they are within the scope of the appended claims or equivalents thereof.

What is claimed is:

1. An information processing apparatus comprising:
    first record control means for controlling a recording of user presence time information, the user presence time information indicating a time at which a user enters a range of a display means displaying content, wherein the user presence time information is generated from an output of a sensor detecting the user;
    second record control means for controlling a recording of operation history information, the operation history information comprising:
        content specifying information for specifying the content as a target of operation,
        operation content information for indicating a content of operation, the content of operation related to a display of the content by the user, and
        operation time information for indicating a time of the operation; and
    audience-quality constituent item calculation means for calculating an audience-quality constituent item according to the user presence time information and the operation history information, the audience-quality constituent item indicating a quality of the content watched by the user according to one or more values, and further comprising:
        degree-of-expectation calculation means for calculating an evaluation value of a degree of the user's prior expectation that the user would view the content;
        degree-of-concentration calculation means for calculating an evaluation value of a degree of concentration of the user during watching of the content; and
        degree-of-satisfaction calculation means for calculating an evaluation value of a degree of satisfaction of the user after having watched the content, wherein the value of the degree of satisfaction is determined differently based on whether the user watched content that had been previously recorded.

2. The information processing apparatus according to claim 1, further comprising a third record control means for:
    acquiring the content specifying information,
    acquiring EPG information containing a broadcast start time and a broadcast end time of the content, and
    controlling a recording of the EPG information, wherein the means for calculating audience-quality constituent item calculates the audience-quality constituent item according to the user presence time information, the operation history information, and the EPG information.

3. The information processing apparatus according to claim 1, further comprising an audience quality generation means for generating data of audience quality according to a value of the audience-quality constituent item.

4. The information processing apparatus according to claim 3, wherein the audience quality generation means stores the data of the audience quality into an audience quality database, and the data of the audience quality stored in the audience quality database is transmitted to another apparatus via a network at a preset timing.

5. The information processing apparatus according to claim 4, further comprising deletion means for deleting unnecessary information among the user presence time information, operation history information, EPG information, and information of the audience quality database.

6. An information-processing method comprising:
    controlling, by a processor, a recording of user presence time information, the user presence time information indicating a time at which a user enters a range of a display that displays content, wherein the user presence time information is generated from an output of a sensor detecting the user;
    controlling a recording of operation history information, the operation history information comprising:
        content specifying information for specifying the content as a target of operation,
        operation content information for indicating content of operation related to display of the content by the user, and
        operation time information for indicating time of the operation;
    calculating an audience-quality constituent item according to the user presence time information and the operation history information, the audience-quality constituent item indicating a quality of content watched by the user according to one or more values, and further comprising:
        calculating an evaluation value of a degree of the user's prior expectation that the user would view the content;
        calculating an evaluation value of a degree of concentration of the user during watching of the content, using, a commercial message time within the content, a zapping time if the content is not played back from previously recorded content, a skipped time if the content is played back from previously recorded content, and the content's broadcasting time; and
        calculating an evaluation value of a degree of satisfaction of the user after having watched the content, wherein the value of the degree of satisfaction is determined differently based on whether the user watched content that had been previously recorded.

7. The information processing method according to claim 6, further comprising:
    acquiring the content specifying information;
    acquiring EPG information containing a broadcast start time and a broadcast end time of the content, and
    controlling a recording of the EPG information, wherein calculating the audience-quality constituent item further comprises calculating the audience-quality constituent item according to the user presence time information, the operation history information, and the EPG information.

8. The information processing method according to claim 6, further comprising generating data of an audience quality according to a value of the audience-quality constituent item.

9. The information processing method according to claim 8, wherein generating data of the audience quality further comprises storing the data of the audience quality into an audience quality database, wherein the data of the audience quality stored in the audience quality database is transmitted to another apparatus via a network at a preset timing.

10. The information processing method according to claim 9, further comprising deleting unnecessary information among the user presence time information, operation history information, EPG information, and information of the audience quality database.

11. A recording medium recording a computer-readable program for causing a computer to execute a method, the method comprising:
   controlling, by a processor, a recording of user presence time information, the user presence time information indicating a time at which a user enters a range of a display that displays content, wherein the user presence time information is generated from an output of a sensor detecting the user;
   controlling a recording of operation history information, the operation history information comprising:
      content specifying information for specifying the content as a target of operation,
      operation content information for indicating content of operation related to display of the content by the user, and
      operation time information for indicating time of the operation;
   calculating an audience-quality constituent item according to the user presence time information and the operation history information, the audience-quality constituent item indicating a quality of content watched by the user according to one or more values, and further comprising:
      calculating an evaluation value of a degree of the user's prior expectation that the user would view the content;
      calculating an evaluation value of a degree of concentration of the user during watching of the content, using, a commercial message time within the content, a zapping time if the content is not played back from previously recorded content, a skipped time if the content is played back from previously recorded content, and the content's broadcasting time; and
      calculating an evaluation value of a degree of satisfaction of the user after having watched the content, wherein the value of the degree of satisfaction is determined differently based on whether the user watched content that had been previously recorded.

12. The recording medium according to claim 11, the method further comprising:
   acquiring the content specifying information;
   acquiring EPG information containing a broadcast start time and a broadcast end time of the content, and
   controlling a recording of the EPG information, wherein calculating the audience-quality constituent item further comprises calculating the audience-quality constituent item according to the user presence time information, the operation history information, and the EPG information.

13. The recording medium according to claim 11, the method further comprising generating data of an audience quality according to a value of the audience-quality constituent item.

14. The recording medium according to claim 13, wherein generating data of the audience quality further comprises storing the data of the audience quality into an audience quality database, wherein the data of the audience quality stored in the audience quality database is transmitted to another apparatus via a network at a preset timing.

15. The recording medium according to claim 14, the method further comprising deleting unnecessary information among the user presence time information, operation history information, EPG information, and information of the audience quality database.

16. An information processing apparatus comprising:
   a first record controller adapted to control a recording of user presence time information, the user presence time information indicating a time at which a user-enters a range of a display that displays content, wherein the user presence time information is generated from an output of a sensor detecting the user;
   a second record controller adapted to control a recording of operation history information, the operation history information comprising:
      content specifying information for specifying the content as a target of operation,
      operation content information for indicating a content of operation, the content of operation related to a display of the content by the user, and
      operation time information for indicating time of the operation; and
   an audience-quality calculation unit adapted to calculate an audience-quality constituent item according to the user presence time information and the operation history information, the audience-quality constituent item indicating a quality of the content watched by the user according to one or more values, and further adapted to calculate:
      an evaluation value of a degree of the user's prior expectation that user would view the content;
      an evaluation value of a degree of concentration of the user during watching of the content, using, a commercial message time within the content, a zapping time if the content is not played back from previously recorded content, a skipped time if the content is played back from previously recorded content, and the content's broadcasting time; and
      an evaluation value of a degree of satisfaction of the user after having watched the content, wherein the value of the degree of satisfaction is determined differently based on whether the user watched content that had been previously recorded.

* * * * *